(12) United States Patent
Kang

(10) Patent No.: US 11,858,433 B2
(45) Date of Patent: Jan. 2, 2024

(54) CLEARANCE ADJUSTING DEVICE FOR CABLE

(71) Applicants: Hyundai Motor Company, Seoul (KR); Kia Motors Corporation, Seoul (KR)

(72) Inventor: Sung Ju Kang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 679 days.

(21) Appl. No.: 17/099,196

(22) Filed: Nov. 16, 2020

(65) Prior Publication Data

US 2022/0017024 A1 Jan. 20, 2022

(30) Foreign Application Priority Data

Jul. 15, 2020 (KR) .................... 10-2020-0087632

(51) Int. Cl.
*B60R 16/02* (2006.01)
*B62D 25/10* (2006.01)
*E05B 79/20* (2014.01)

(52) U.S. Cl.
CPC .......... *B60R 16/0215* (2013.01); *B62D 25/10* (2013.01); *E05B 79/20* (2013.01); *E05Y 2201/654* (2013.01); *E05Y 2900/536* (2013.01)

(58) Field of Classification Search
CPC . B60R 16/0215; B60R 16/0207; B62D 25/10; B62D 25/12; E05B 79/20
See application file for complete search history.

(56) References Cited

U.S. PATENT DOCUMENTS

| 3,205,727 | A | * | 9/1965 | Sevrence | F16C 1/10 |
| | | | | | 74/500.5 |
| 4,304,148 | A | * | 12/1981 | Hamman | F16L 37/008 |
| | | | | | 403/197 |
| 4,534,239 | A | * | 8/1985 | Heimann | F16C 1/107 |
| | | | | | 277/572 |
| 4,875,350 | A | * | 10/1989 | Faust | B60R 25/04 |
| | | | | | 70/DIG. 49 |
| 4,958,536 | A | * | 9/1990 | Baumgarten | B60T 7/108 |
| | | | | | 74/501.5 R |

(Continued)

FOREIGN PATENT DOCUMENTS

KR 19970015150 A 4/1997

*Primary Examiner* — Jeffrey J Restifo
(74) *Attorney, Agent, or Firm* — Slater Matsil, LLP

(57) ABSTRACT

A clearance adjusting device for a cable includes a wire having a first side connected to a drive mechanism and a second side connected to an operation mechanism to enable the drive mechanism to be operated in conjunction with the operation mechanism when the wire is moved in an other direction by operation of the operation mechanism, an elastic part having a first end portion connected to the wire and formed to be elastically compressible, and a clearance elimination mechanism fixed to a base, with the wire and the elastic part embedded therein while the wire passes therethrough, in a state where a second end portion of the elastic part is connected to and supported by the clearance elimination mechanism, such that the wire receives an elastic force provided in the other direction toward the operation mechanism by the elastic part.

16 Claims, 4 Drawing Sheets

(56) References Cited

U.S. PATENT DOCUMENTS

| | | | | |
|---|---|---|---|---|
| 5,582,074 A * | 12/1996 | Kelley | | F16C 1/103 |
| | | | | 74/502.4 |
| 6,213,235 B1 * | 4/2001 | Elhardt | | B62D 25/10 |
| | | | | 180/69.2 |
| 6,361,091 B1 * | 3/2002 | Weschler | | E05B 83/24 |
| | | | | 292/225 |
| 6,394,211 B1 * | 5/2002 | Palenchar | | E05B 79/20 |
| | | | | 180/69.21 |
| 6,474,190 B1 * | 11/2002 | Choo | | E05B 79/20 |
| | | | | 292/336.3 |
| 6,705,178 B1 * | 3/2004 | Grandjean | | F16C 1/14 |
| | | | | 292/DIG. 31 |
| 10,508,478 B2 * | 12/2019 | Töpfer | | E05B 81/40 |
| 10,584,519 B2 * | 3/2020 | Häger | | F16C 1/145 |
| 11,136,794 B2 * | 10/2021 | Uhrin | | E05B 85/00 |
| 2002/0101084 A1 * | 8/2002 | Weschler | | E05B 83/24 |
| | | | | 292/336.3 |
| 2002/0104400 A1 * | 8/2002 | Hillgaertner | | E05B 83/24 |
| | | | | 74/501.6 |
| 2003/0080572 A1 * | 5/2003 | So | | E05B 79/20 |
| | | | | 292/336.3 |
| 2016/0123044 A1 * | 5/2016 | Rosales | | E05C 3/16 |
| | | | | 74/502.6 |
| 2016/0168884 A1 * | 6/2016 | Hillgaertner | | E05B 83/247 |
| | | | | 292/196 |
| 2018/0016822 A1 * | 1/2018 | Sturm | | E05B 81/40 |
| 2019/0218829 A1 * | 7/2019 | Uhrin | | F16C 1/107 |
| 2019/0277068 A1 * | 9/2019 | Nelsen | | E05B 81/16 |
| 2020/0024870 A1 * | 1/2020 | Sasaki | | E05B 83/24 |
| 2020/0181954 A1 * | 6/2020 | Hwang | | B62D 25/12 |
| 2020/0291694 A1 * | 9/2020 | Bendel | | E05B 85/16 |
| 2020/0318400 A1 * | 10/2020 | Johann | | E05B 83/24 |
| 2020/0378432 A1 * | 12/2020 | Gordon | | F16C 1/102 |
| 2021/0404224 A1 * | 12/2021 | Miyake | | E05B 79/20 |
| 2022/0017024 A1 * | 1/2022 | Kang | | F16C 1/16 |
| 2023/0160240 A1 * | 5/2023 | Kim | | E05B 83/243 |
| | | | | 296/193.11 |
| 2023/0295965 A1 * | 9/2023 | Svoboda | | E05B 83/243 |
| | | | | 292/110 |

* cited by examiner

CLEARANCE ADJUSTING DEVICE FOR CABLE

CROSS-REFERENCE TO RELATED APPLICATIONS

This application claims the benefit of Korean Patent Application No. 10-2020-0087632, filed on Jul. 15, 2020, which application is hereby incorporated herein by reference.

TECHNICAL FIELD

The present disclosure relates to a clearance adjusting device for a cable.

BACKGROUND

In general, a mechanical device includes a cable for enabling drive devices to be operated in conjunction with each other. Such a cable is used as a clutch cable, a gear shift cable, a hood opening and closing cable, or the like, when applied to a vehicle, to enable various mechanisms to be operated in conjunction with each other.

In particular, due to a tolerance when the cable is installed and a variation in length of the cable resulting from frequent use, there may be an event where the mechanisms fail to operate in conjunction with each other smoothly through the cable. That is, concerning a hood of a large-size vehicle, when a lever is operated, left and right latches connected through the cable need to be simultaneously operated, but when a clearance of the cable is generated, there may be a problem such as poor locking or poor operational feeling.

In order to resolve the generation of the clearance of the cable, the cable has been removed and then reinstalled. However, this requires an increase in the number of works and there is a limit in resolving a clearance generated at the time of mounting the cable.

The contents described as the related art have been provided only to assist in understanding the background of the present disclosure and should not be considered as corresponding to the related art known to those having ordinary skill in the art.

SUMMARY

The present disclosure relates to a clearance adjusting device for a cable. Particular embodiments relate to a clearance adjusting device for a cable capable of simply adjusting a clearance generated at the time of installing a cable.

An embodiment of the present disclosure provides a clearance adjusting device for a cable capable of resolving a clearance tolerance at the time of installing the cable by automatically adjusting a clearance of the cable and resolving the clearance merely through a simple operation of adjusting the clearance even when the clearance of the cable is in an excessive adjustment range, resulting in an improvement in convenience of production and workability.

According to an embodiment of the present disclosure, a clearance adjusting device for a cable includes a wire having one side to which a drive mechanism is connected and the other side to which an operation mechanism is connected to enable the drive mechanism to be operated in conjunction with the operation mechanism when the wire is moved in the other direction by operation of the operation mechanism, an elastic part having one end portion connected to the wire and formed to be elastically compressible, and a clearance elimination mechanism fixed to a base, with the wire together with the elastic part embedded therein while the wire passes therethrough, in a state where the other end portion of the elastic part is connected to and supported by the clearance elimination mechanism, such that the wire receives an elastic force provided in the other direction toward the operation mechanism by the elastic part to eliminate a clearance between the drive mechanism and the wire when the clearance is generated.

The clearance elimination mechanism may include a fixing socket mounted on and fixed to the base, having a hollow region to allow the wire to pass therethrough, and having a seating space for the elastic part to be seated therein such that the other end portion of the elastic part is supported by the other end of the seating space.

The wire may have a hook portion bent to hook the one end portion of the elastic part and the fixing socket may have a connection portion bent to hook the other end portion of the elastic part at the other end of the seating space to connect the wire to the fixing socket via the elastic part.

The seating space in the fixing socket may be formed to extend longer than a length of the elastic part when tensioned.

The clearance elimination mechanism may further include a length adjustment socket mounted to be movable on the fixing socket in a length direction, while allowing the wire to pass therethrough, to adjust the clearance between the drive mechanism and the wire according to a position to which the length adjustment socket moves.

The length adjustment socket may include a conduit part allowing the wire to pass therethrough and extending to the operation mechanism along the wire, and an adjustment socket having one end portion into which the fixing socket is inserted and the other end portion into which the conduit part is inserted, and screw-connected to an outer circumferential surface of the fixing socket and to an outer circumferential surface of the conduit part.

A connection socket inserted into the other end portion of the adjustment socket may be provided at one end of the conduit part, and the connection socket and the adjustment socket may be screw-connected to each other.

Screw threads may be formed on the outer circumferential surface of the fixing socket and on the outer circumferential surface of the conduit part, respectively, and screw threads corresponding to the respective screw threads of the fixing socket and the conduit part may be formed on an inner circumferential surface of the adjustment socket, and the respective screw threads of the fixing socket and the conduit part may be formed to extend in opposite directions.

DETAILED DESCRIPTION OF ILLUSTRATIVE EMBODIMENTS

Hereinafter, a clearance adjusting device for a cable according to a preferred embodiment of the present disclosure will be described with reference to the accompanying drawings.

Figure 1:
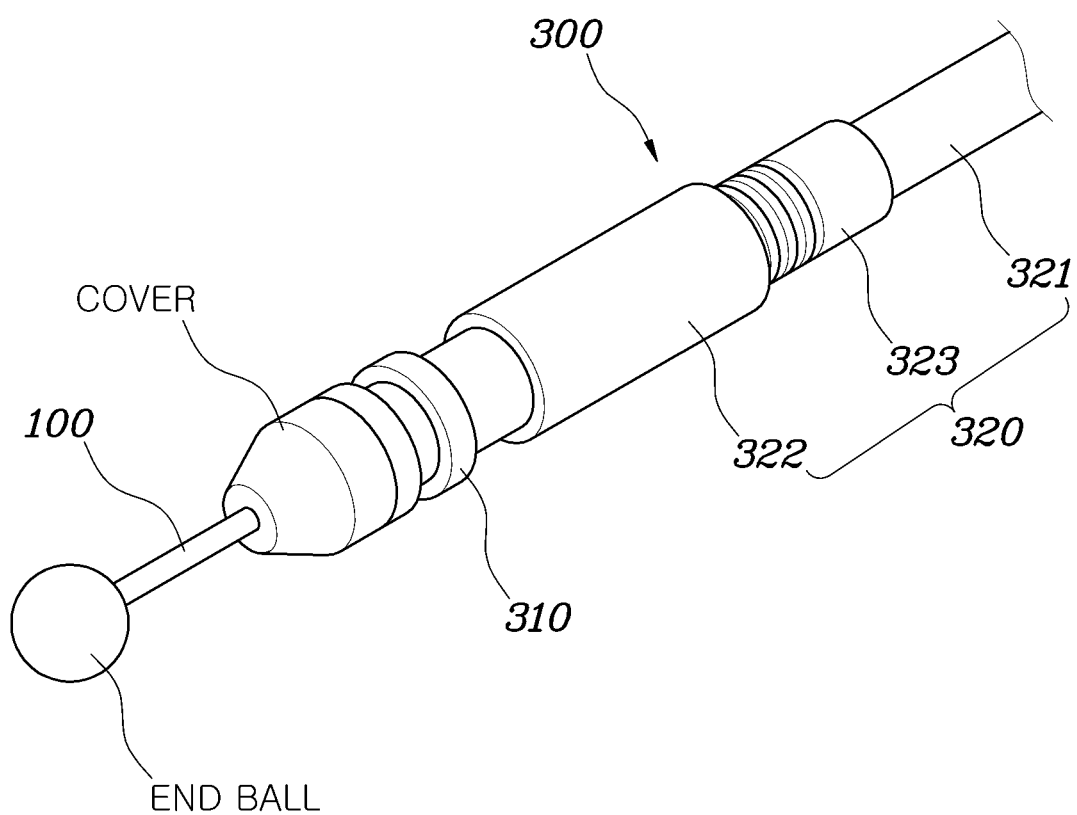
FIG. 1 is a view illustrating a clearance adjusting device for a cable according to embodiments of the present disclosure.
Figure 2:
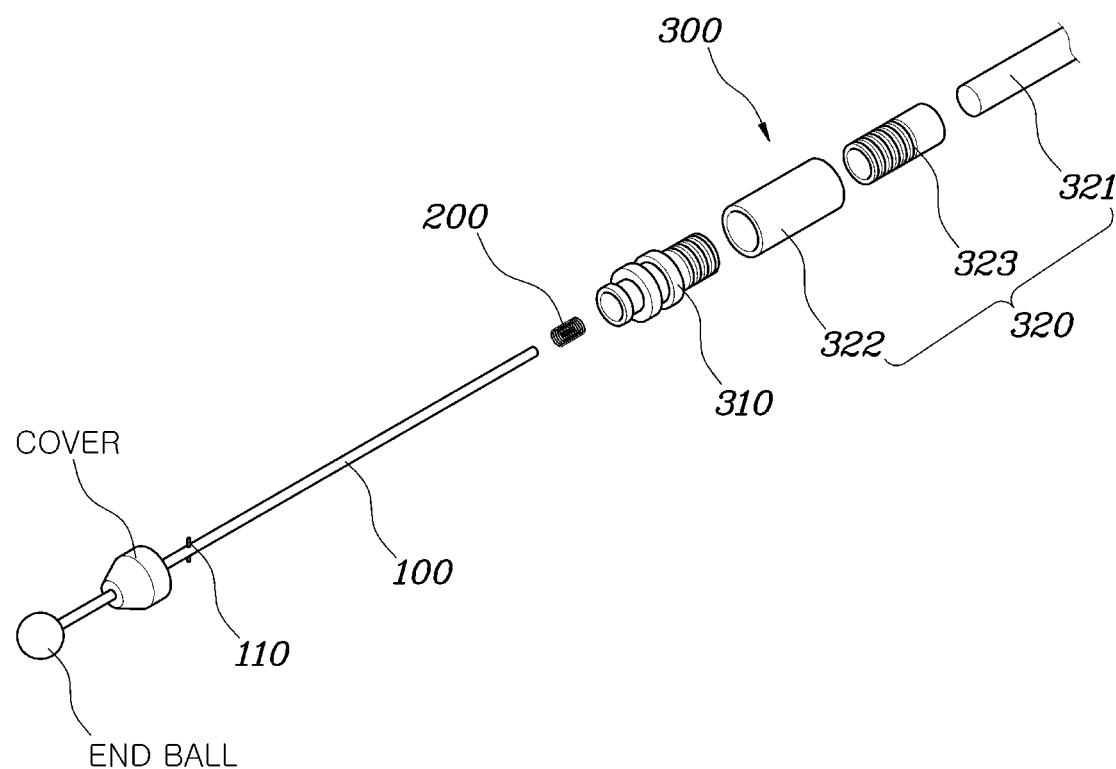
FIG. 2 is an exploded view of the clearance adjusting device for a cable illustrated in FIG. 1.
Figure 3:
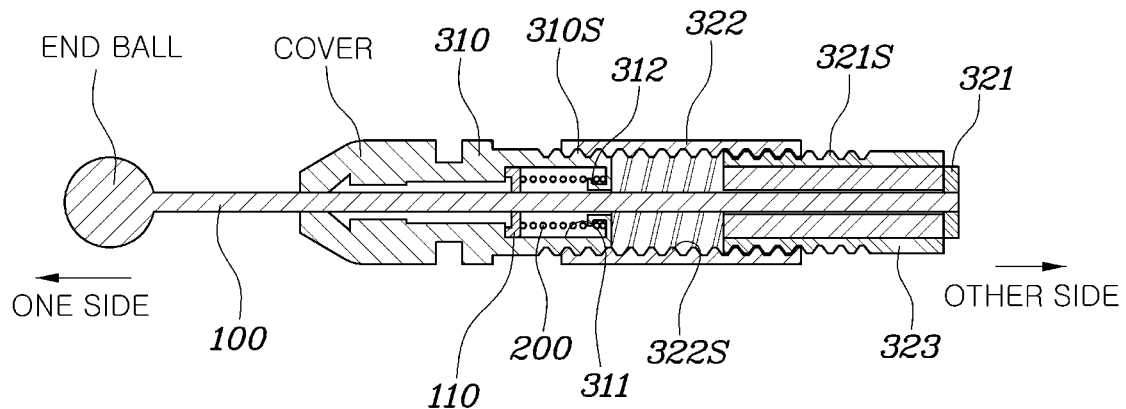
FIG. 3 is a cross-sectional view of the clearance adjusting device for a cable illustrated in FIG. 1.
Figure 4:
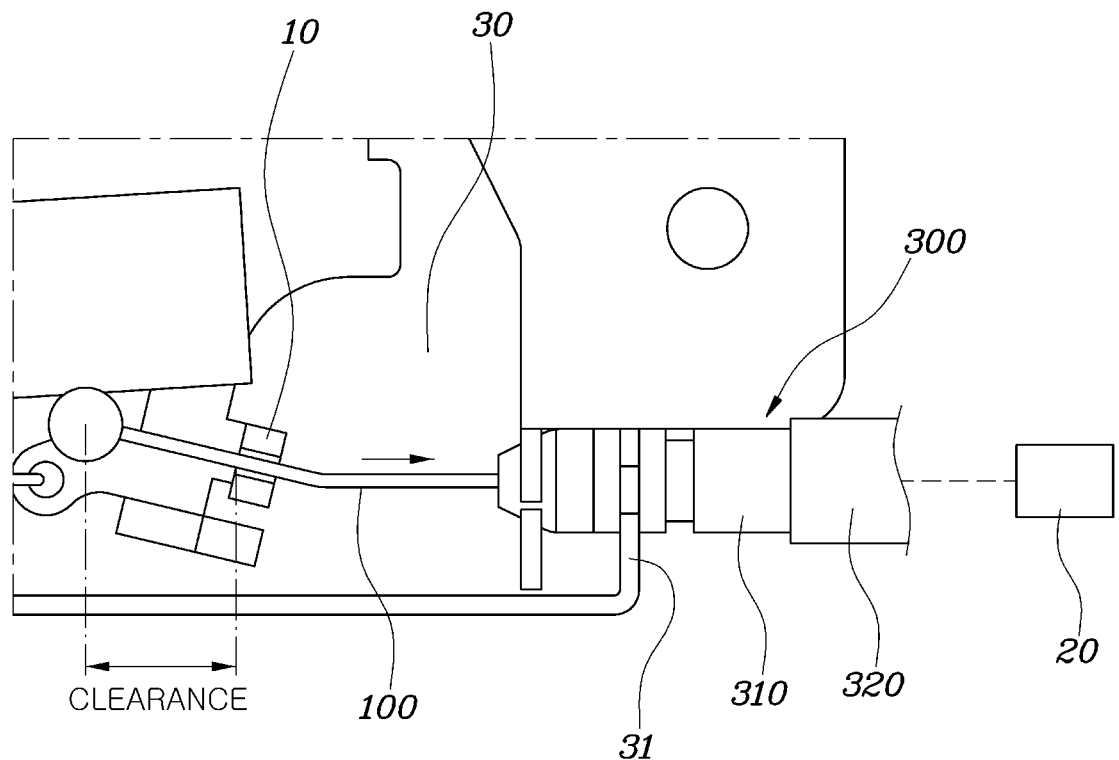
FIG. 4 is a view for explaining that a clearance is adjusted by the clearance adjusting device for a cable illustrated in FIG. 1.
Figure 5:
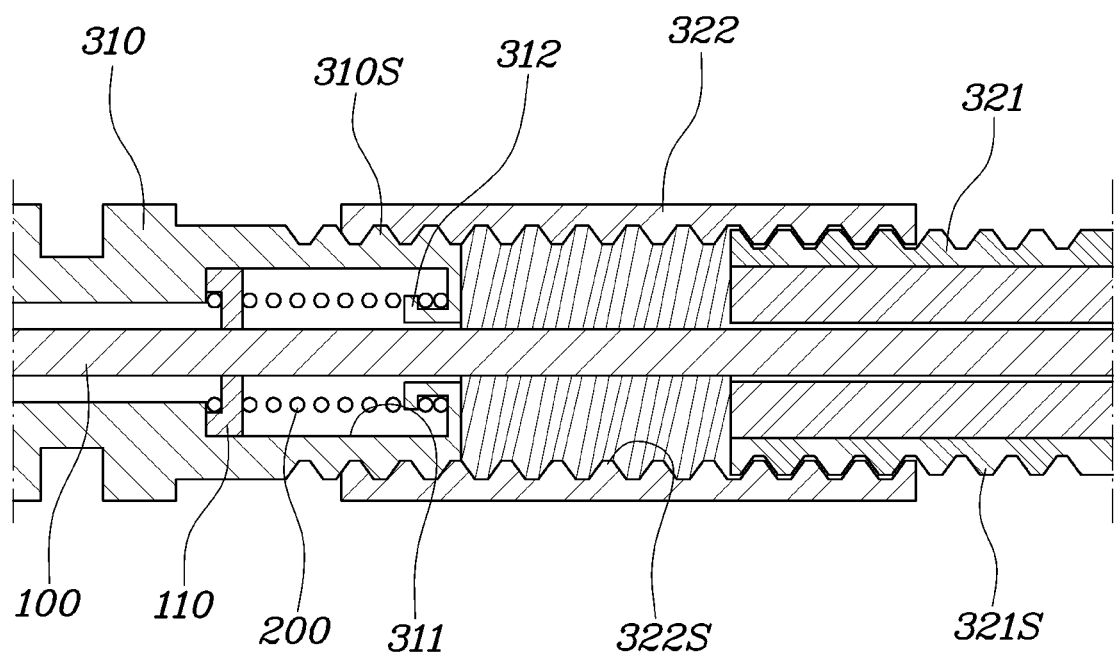
FIG. 5 is an enlarged view for explaining a wire, an elastic part, and a clearance adjustment mechanism in the clearance adjusting device for a cable illustrated in FIG. 1.

FIG. 1 is a view illustrating a clearance adjusting device for a cable according to embodiments of the present disclosure, FIG. 2 is an exploded view of the clearance adjusting device for a cable illustrated in FIG. 1, FIG. 3 is a cross-sectional view of the clearance adjusting device for a cable illustrated in FIG. 1, FIG. 4 is a view for explaining that a clearance is adjusted by the clearance adjusting device for a cable illustrated in FIG. 1, and FIG. 5 is an enlarged view for explaining a wire, an elastic part, and a clearance adjustment mechanism in the clearance adjusting device for a cable illustrated in FIG. 1.

As illustrated in FIGS. 1 to 4, the clearance adjusting device for a cable according to embodiments of the present disclosure includes a wire 100 having one side to which a drive mechanism 10 is connected and the other side to which an operation mechanism 20 is connected to enable the drive mechanism 10 to be operated in conjunction with the operation mechanism 20 when the wire 100 is moved in the other direction by operation of the operation mechanism 20. It further includes an elastic part 200 having one end portion connected to the wire 100 and formed to be elastically compressible and a clearance elimination mechanism 300 fixed to a base 30, with the wire 100 together with the elastic part 200 embedded therein while the wire 100 passes therethrough, in a state where the other end portion of the elastic part 200 is connected to and supported by the clearance elimination mechanism 300, such that the wire 100 receives an elastic force provided in the other direction toward the operation mechanism 20 by the elastic part 200 to eliminate a clearance between the drive mechanism 10 and the wire 100 when the clearance is generated.

Here, the wire 100 is provided to enable the drive mechanism 10 and the operation mechanism 20 to be operated in conjunction with each other. When the operation mechanism 20 is operated, the wire boo is moved and the drive mechanism 10 is operated accordingly. As an example, when being applied to a latch structure of a hood for a vehicle, the drive mechanism 10 may be a latch device and the operation mechanism 20 may be an operation lever. When the operation lever is operated, the wire 100 may be pulled and a locking operation of the latch device may be released accordingly.

However, a tolerance occurring at the time of assembling the wire 100 or a tolerance resulting from accumulated use of the wire 100 causes a problem that the drive mechanism 10 fails to be operated in conjunction with the operation mechanism 20 when the operation mechanism 20 is operated. In embodiments of the present disclosure, the tolerance occurring in the wire 100 is resolved through the elastic part 200 and the clearance elimination mechanism 300.

To this end, the clearance elimination mechanism 300 is fixed to the base 30 to fix its position. Here, the base 30 may be a vehicle body, and a bracket 31 for mounting the clearance elimination mechanism 300 may be formed on the base 30. Inside the clearance elimination mechanism 300, the wire 100 passes and the elastic part 200 is embedded. The elastic part 200 may be formed of a compression spring, and one end portion of the elastic part 200 is connected to the wire 100 and the other end portion of the elastic part 200 is supported inside the clearance elimination mechanism 300, such that the wire 100 receives an elastic force provided in the other direction. In addition, the elastic part 200 is provided in a tensioned state, when connected to the drive mechanism 10 and the operation mechanism 20, to provide an elastic force to the wire 100.

Accordingly, the wire 100 is always moved in the other direction by the elastic force of the elastic part 200. Thus, even if a clearance of the wire 100 with respect to the drive mechanism 10 is generated, the clearance is eliminated by the elastic force of the elastic part 200.

As illustrated in FIG. 4, even if the wire 100 has an excessive length in a state where one end of the wire 100 is connected to the drive mechanism 10, the clearance between the drive mechanism 10 and the wire 100 may be eliminated because the wire 100 is pulled in the other direction by the elastic part 200 provided in the clearance elimination mechanism 300.

As described above, according to embodiments of the present disclosure, the clearance of the wire 100 can be automatically adjusted by the elastic force of the elastic part 200, thereby resolving a clearance tolerance.

More specifically, as illustrated in FIGS. 3 and 5, the clearance elimination mechanism 300 may include a fixing socket 310 mounted on and fixed to the base 30, having a hollow region to allow the wire 100 to pass therethrough, and having a seating space 311 for the elastic part 200 to be seated therein such that the other end portion of the elastic part 200 is supported by the other end of the seating space 311.

That is, the fixing socket 310 is mounted on the base 30 to fix its position, and has the hollow region to allow the wire 100 pass therethrough. In particular, the seating space 311 in which the elastic part 200 is seated is formed inside the fixing socket 310, and the elastic part 200 is supported by the other end of the seating space 311. Here, the seating space 311 of the fixing socket 310 may extend longer than a length of the elastic part 200 when tensioned, and thus, the elastic part 200 may be provided in a tensioned state in the seating space 311. In addition, the seating space 311 may be formed to extend in a linear form to smoothly perform an operation of tensioning or compressing the elastic part 200. That is, since one end portion of the elastic part 200 is connected to the wire 100 and the other end portion of the elastic part 200 is supported by the other end of the seating space 311 in the fixing socket 310, the wire 100 maintains the elastic force in the other direction.

This is preceded by a process of connecting the wire 100 to the drive mechanism 10 in a state where the spring is tensioned by pulling one end of the wire 100 at the time of installing the wire 100. The wire 100 continuously receives the elastic force provided in the other direction by the compressing operation of the elastic part 200, thereby eliminating the clearance between the wire 100 and the drive mechanism 10.

Meanwhile, as illustrated in FIG. 5, the wire 100 may have a hook portion no bent to hook one end portion of the elastic part 200 and the fixing socket 310 may have a connection portion 312 bent to hook the other end portion of the elastic part 200 at the other end of the seating space 311 to connect the wire 100 to the fixing socket 310 via the elastic part 200. In this way, since the elastic part 200 is hook-connected to the wire 100 and to the fixing socket 310, a process of mounting the elastic part 200 is simplified and the elastic part 200 does not escape from the wire 100 and from the fixing socket 310. Here, the hook portion no of the wire 100 may have such a shape as to extend in a circumferential direction and then be bent in one direction in order to hook one end portion of the elastic part 200 and prevent the elastic part 200 from escaping in the other direction. In addition, the other end portion of the elastic part 200 is supported by the other end of the seating space 311, and the connection portion 312 has such a shape as to extend from the other end of the seating space 311 inward of the elastic part 200 and then be bent in the circumferential direction, thereby preventing the elastic part 200 from escaping in one direction.

In this way, since the wire 100 is connected to the fixing socket 310 via the elastic part 200, the wire 100 is always moved in the other direction by the elastic force of the elastic part 200, thereby eliminating the clearance between the drive mechanism and the wire 100.

Meanwhile, the clearance elimination mechanism 300 may further include a length adjustment socket 320 mounted to be movable on the fixing socket 310 in a length direction, while allowing the wire 100 to pass therethrough, to adjust the clearance between the drive mechanism 10 and the wire 100 according to a position to which the length adjustment socket 320 moves.

The length adjustment socket 320 adjusts a position of the wire 100 according to the position to which the length adjustment socket 320 moves on the fixing socket 310 in the length direction. In a case where the clearance is not eliminated by the elastic part 200, the clearance of the wire 100 can be adjusted by the length adjustment socket 320. That is, the length adjustment socket 320 is formed to surround the wire 100, and when the length adjustment socket 320 moves on the fixing socket 310 in the other direction, an overall length of components surrounding the wire 100 increases, which functions to reduce a length of the wire. Accordingly, a clearance resulting from an excessive length of the wire 100 is eliminated, and a tolerance between parts is resolved.

More specifically, the length adjustment socket 320 may include a conduit part 321 allowing the wire 100 to pass therethrough and extending to the operation mechanism 20 along the wire 100, and an adjustment socket 322 having one end portion into which the fixing socket 310 is inserted and the other end portion into which the conduit part 321 is inserted, and screw-connected to an outer circumferential surface of the fixing socket 310 and to an outer circumferential surface of the conduit part 321.

As illustrated in FIG. 5, the length adjustment socket 320 includes the conduit part 321 and the adjustment socket 322. Here, the conduit part 321 extends along the wire 100 while one end portion thereof is connected to the adjustment socket 322 and the other end portion thereof is supported by the operation mechanism 20. The fixing socket 310 may be inserted into one end portion of the adjustment socket 322 and one end of the conduit part 321 may be inserted into the other end portion of the adjustment socket 322, and a position of the conduit part 321 may be changed inside the adjustment socket 322. That is, the adjustment socket 322 is mounted on the fixing socket 310 to fix its position, and the conduit part 321 is moved in the adjustment socket 322 to adjust an overall length of the conduit part 321.

To explain the adjustment of the overall length of the conduit part 321, the conduit part 321 is made of a flexible material while allowing the wire 100 to pass therethrough. Here, one end of the conduit part 321 is inserted into the adjustment socket 322, and the conduit part 321 extends to the operation mechanism 20 such that the other end of the conduit part 321 is supported by the operation mechanism 20. Thus, the overall length of the conduit part 321 may be a length from a portion exposed from the adjustment socket 322 to a portion supported by the operation mechanism 20. Accordingly, the overall length of the conduit part 321 may be changed by changing the position of the conduit part 321 in a state where the conduit part 321 is inserted into the adjustment socket 322. This works in such a manner that when the overall length of the conduit part 321 increases, the length of the wire 100 therein relatively decreases. Thus, according to embodiments of the present disclosure, it is possible to adjust the length of the wire 100 by changing the position of the conduit part 321 in the adjustment socket 322.

Here, as illustrated in FIGS. 3 and 5, screw threads 310S and 321S may be formed on the outer circumferential surface of the fixing socket 310 and on the outer circumferential surface of the conduit part 321, respectively, and screw threads 322S corresponding to the respective screw threads 310S and 321S of the fixing socket 310 and the conduit part 321 may be formed on an inner circumferential surface of the adjustment socket 322. The respective screw threads 310S and 321S of the fixing socket 310 and the conduit part 321 may extend in opposite directions.

In this way, each of the fixing socket 310 and the conduit part 321 may be screw-connected to the adjustment socket 322, while being inserted thereinto, to move the conduit part 321 when the adjustment socket 322 is rotated. That is, when the adjustment socket 322 is rotated on the fixing socket 310 fixed to the base 30, the conduit part 321 is moved along the screw thread 322S of the adjustment socket 322. To this end, the screw thread 310S of the fixing socket 310 and the screw thread 321S of the conduit part 321 extend in the opposite directions, and the fixing socket 310 and the conduit part 321 connected via the adjustment socket 322 are moved close to each other or far away from each other when the adjustment socket 322 is rotated. Accordingly, the overall length of the conduit part 321 may be adjusted by rotating the adjustment socket 322. When the conduit part 321 is moved in a direction far away from the fixing socket 310 by rotating the adjustment socket 322, the overall length of the conduit part 321 increases and the length of the wire 100 relatively decreases, thereby adjusting the clearance resulting from the excessive length of the wire 100.

Meanwhile, a connection socket 323 inserted into the other end portion of the adjustment socket 322 may be provided at one end of the conduit part 321, and the connection socket 323 and the adjustment socket 322 may be screw-connected to each other. Accordingly, the conduit part 321 may be formed long to allow the wire 100 to pass therethrough when being molded, and the conduit part 321 may be connected to the adjustment socket 322 by separately molding the connection socket 323 to be connected to the adjustment socket 322 and coupling the connection socket 323 to one end of the conduit part 321, thereby reducing a manufacturing cost of the conduit part 321. That is, in a case where all screw threads are formed on the conduit part 321 in advance, there is a problem that the conduit part 321 should be replaced in its entirety when the screw threads are damaged, resulting in an increase in the manufacturing cost. Thus, the conduit part 321 may be provided with the connection socket 323 for connection to the adjustment socket 322.

In the clearance adjusting device for a cable having the structure as described above, the clearance of the wire 100 can be automatically adjusted by the elastic force of the elastic part 200, thereby resolving a clearance tolerance that occurs at the time of installing the wire 100. In addition, even if the clearance of the wire 100 becomes excessive, the length of the wire 100 can be adjusted merely through a simple process of rotating the clearance elimination mechanism 300, resulting in an improvement in convenience of work.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A clearance adjusting device for a cable, the device comprising:
   a wire having a first side to which a drive mechanism is connected and a second side to which an operation mechanism is connected to enable the drive mechanism to be operated in conjunction with the operation mechanism when the wire is moved in another direction by operation of the operation mechanism;
   an elastic part having a first end portion connected to the wire and formed to be elastically compressible; and
   a clearance elimination mechanism fixed to a base, with the wire together with the elastic part embedded therein while the wire passes therethrough, in a state where a second end portion of the elastic part is connected to and supported by the clearance elimination mechanism, such that the wire receives an elastic force provided in the other direction toward the operation mechanism by the elastic part to eliminate a clearance between the drive mechanism and the wire when the clearance is generated.

2. The device of claim 1, wherein the clearance elimination mechanism includes a fixing socket mounted on and fixed to the base, having a hollow region to allow the wire to pass therethrough, and having a seating space for the elastic part to be seated therein such that the second end portion of the elastic part is supported by a first end of the seating space.

3. The device of claim 2, wherein the wire has a hook portion bent to hook the first end portion of the elastic part and the fixing socket has a connection portion bent to hook the second end portion of the elastic part at the first end of the seating space to connect the wire to the fixing socket via the elastic part.

4. The device of claim 2, wherein the seating space in the fixing socket is formed to extend longer than a length of the elastic part when tensioned.

5. The device of claim 2, wherein the clearance elimination mechanism further includes a length adjustment socket mounted to be movable on the fixing socket in a length direction, while allowing the wire to pass therethrough, to adjust the clearance between the drive mechanism and the wire according to a position to which the length adjustment socket moves.

6. The device of claim 5, wherein the length adjustment socket includes:
   a conduit part configured to allow the wire to pass therethrough and extending to the operation mechanism along the wire; and
   an adjustment socket having a first end portion into which the fixing socket is inserted and a second end portion into which the conduit part is inserted, and screw-connected to an outer circumferential surface of the fixing socket and to an outer circumferential surface of the conduit part.

7. The device of claim 6, wherein a connection socket inserted into the second end portion of the adjustment socket is provided at a first end of the conduit part, and the connection socket and the adjustment socket are screw-connected to each other.

8. The device of claim 6, wherein:
   screw threads are formed on the outer circumferential surface of the fixing socket and on the outer circumferential surface of the conduit part, respectively;
   screw threads corresponding to the screw threads of the fixing socket and the conduit part are formed on an inner circumferential surface of the adjustment socket; and
   the screw threads of the fixing socket and the conduit part extend in opposite directions.

9. A vehicle comprising:
   a vehicle body;
   a vehicle hood connected to the vehicle body;
   a latch device;
   an operation lever;
   a wire having a first side connected to the latch device and a second side connected to the operation lever, wherein when the wire is moved in a first direction by operation of the operation lever, the latch device is configured to be operated in conjunction with the operation lever;
   an elastic part being elastically compressible and having a first end portion connected to the wire; and
   a clearance elimination mechanism fixed to the vehicle body, wherein the elastic part is embedded in the clearance elimination mechanism and a second end portion of the elastic part is connected to and supported by the clearance elimination mechanism, and wherein the wire passes through the clearance elimination mechanism, such that the wire is configured to receive an elastic force provided in the first direction toward the operation lever by the elastic part to eliminate a clearance between the latch device and the wire when the clearance is generated.

10. The vehicle of claim 9, wherein the clearance elimination mechanism includes a fixing socket mounted on and fixed to the vehicle body, having a hollow region to allow the wire to pass therethrough, and having a seating space for the elastic part to be seated therein such that the second end portion of the elastic part is supported by a first end of the seating space.

11. The vehicle of claim 10, wherein the wire has a hook portion bent to hook the first end portion of the elastic part and the fixing socket has a connection portion bent to hook the second end portion of the elastic part at the first end of the seating space to connect the wire to the fixing socket via the elastic part.

12. The vehicle of claim 10, wherein the seating space in the fixing socket is formed to extend longer than a length of the elastic part when tensioned.

13. The vehicle of claim 10, wherein the clearance elimination mechanism further includes a length adjustment socket mounted to be movable on the fixing socket in a length direction, while allowing the wire to pass therethrough, to adjust the clearance between the latch device and the wire according to a position to which the length adjustment socket moves.

14. The vehicle of claim 13, wherein the length adjustment socket includes:
   a conduit part configured to allow the wire to pass therethrough and extending to the operation lever along the wire; and
   an adjustment socket having a first end portion into which the fixing socket is inserted and a second end portion into which the conduit part is inserted, and screw-connected to an outer circumferential surface of the fixing socket and to an outer circumferential surface of the conduit part.

15. The vehicle of claim 14, wherein a connection socket inserted into the second end portion of the adjustment socket is provided at a first end of the conduit part, and the connection socket and the adjustment socket are screw-connected to each other.

16. The vehicle of claim 14, wherein:
   screw threads are formed on the outer circumferential surface of the fixing socket and on the outer circumferential surface of the conduit part, respectively;
   screw threads corresponding to the screw threads of the fixing socket and the conduit part are formed on an inner circumferential surface of the adjustment socket; and
   the screw threads of the fixing socket and the conduit part extend in opposite directions.

\* \* \* \* \*